US010952265B2

(12) United States Patent
Yang et al.

(10) Patent No.: US 10,952,265 B2
(45) Date of Patent: Mar. 16, 2021

(54) DYNAMIC RESOURCE SCALING AND VM MIGRATION IN NG-RAN

(71) Applicant: Apple Inc., Cupertino, CA (US)

(72) Inventors: Feng Yang, Beijing (CN); Alexander Sirotkin, Tel-Aviv (IL); Jaemin Han, Hillsboro, OR (US); Xu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 141 days.

(21) Appl. No.: 16/393,709

(22) Filed: Apr. 24, 2019

(65) Prior Publication Data

US 2019/0254090 A1   Aug. 15, 2019

Related U.S. Application Data

(60) Provisional application No. 62/670,640, filed on May 11, 2018.

(51) Int. Cl.
| | |
|---|---|
| *H04W 76/12* | (2018.01) |
| *H04W 24/04* | (2009.01) |
| *H04W 76/22* | (2018.01) |
| *H04W 76/11* | (2018.01) |
| *H04W 88/08* | (2009.01) |

(52) U.S. Cl.
CPC .......... *H04W 76/12* (2018.02); *H04W 24/04* (2013.01); *H04W 76/11* (2018.02); *H04W 76/22* (2018.02); *H04W 88/085* (2013.01)

(58) Field of Classification Search
None
See application file for complete search history.

(56) References Cited

PUBLICATIONS

R3-181732, 3GPP TSG RAN WG3 NR#99bis,Sanya, China, Apr. 16-20, 2018 (Year: 2018).*
R3-181733, 3GPP TSG RAN WG3 NR#99bis Sanya, China, Apr. 16-20, 2018 (Year: 2018).*
R3-181849 3GPP TSG-RAN WG3#99bis Sanya, China, Apr. 16-20, 2018 (Year: 2018).*
R3-182056 3GPP TSG-RAN WG3 #99bis Sanya, China, Apr. 16-20, 2018 (Year: 2018).*
R3-182241 3GPP TSG-RAN WG3 #99bis Tdoc Sanya, P. R. China, Apr. 16-20, 2018 (Year: 2018).*

(Continued)

*Primary Examiner* — Alex Skripnikov
(74) *Attorney, Agent, or Firm* — Kowert, Hood, Munyon, Rankin & Goetzel, P.C.

(57) ABSTRACT

Systems and methods of modifying the bearer context of a DRB of an E1 interface for a gNB are described. To modify the bearer context associated with a DRB for a particular UE, the gNB-CU-UP transmits a Bearer Context Modification Required message through the E1 interface and receives in response a Bearer Context Modification Confirm message that confirms the modification of the bearer context. The Bearer Context Modification Required message and Bearer Context Modification Confirm message both include the new GTP TEID and TNL address to be used after modification of the bearer context, a gNB-CU-CP UE E1AP ID that uniquely identifies a UE association over the E1 interface within the gNB-CU-CP, a gNB-CU-UP UE E1AP ID that uniquely identifies a UE association over the E1 interface within the gNB-CU-UP, and a DRB ID IE that uniquely identifies the DRB.

20 Claims, 4 Drawing Sheets

(56) References Cited

PUBLICATIONS

R3-182243 3GPP TSG-RAN WG3 #99bis Tdoc Sanya, P. R. China, Apr. 16-20, 2018 (Year: 2018).*
R3-182442 3GPP TSG-RAN WG3 #99bis Tdoc Sanya, P. R. China, Apr. 16-20, 2018 (Year: 2018).*

* cited by examiner

DYNAMIC RESOURCE SCALING AND VM MIGRATION IN NG-RAN

This application claims the benefit of priority under 35 U.S.C. 119(e) to U.S. Provisional Patent Application Ser. No. 62/670,640, filed May 11, 2018, which is incorporated herein by reference in its entirety.

TECHNICAL FIELD

Embodiments pertain to radio access networks (RANs). Some embodiments relate to cellular networks, including Third Generation Partnership Project (3GPP) $5^{th}$ generation (5G) New Radio (NR) (or next generation (NG)) networks. Some embodiments relate to context modification of the E1 interface.

BACKGROUND

The use of various types of systems has increased due to both an increase in the types of devices user equipment (UEs) using network resources as well as the amount of data and bandwidth being used by various applications, such as video streaming, operating on these UEs. To increase the ability of the network to contend with the explosion in network use and variation, the next generation of communication systems is being created. With the advent of any new technology, the introduction of a complex new communication system engenders a large number of issues to be addressed both in the system itself and in compatibility with previous systems and devices. Such issues arise, for example, when engaging in a context modification procedure for the E1 interface in 5G NodeBs (gNB).

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate specific aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Figure 1:
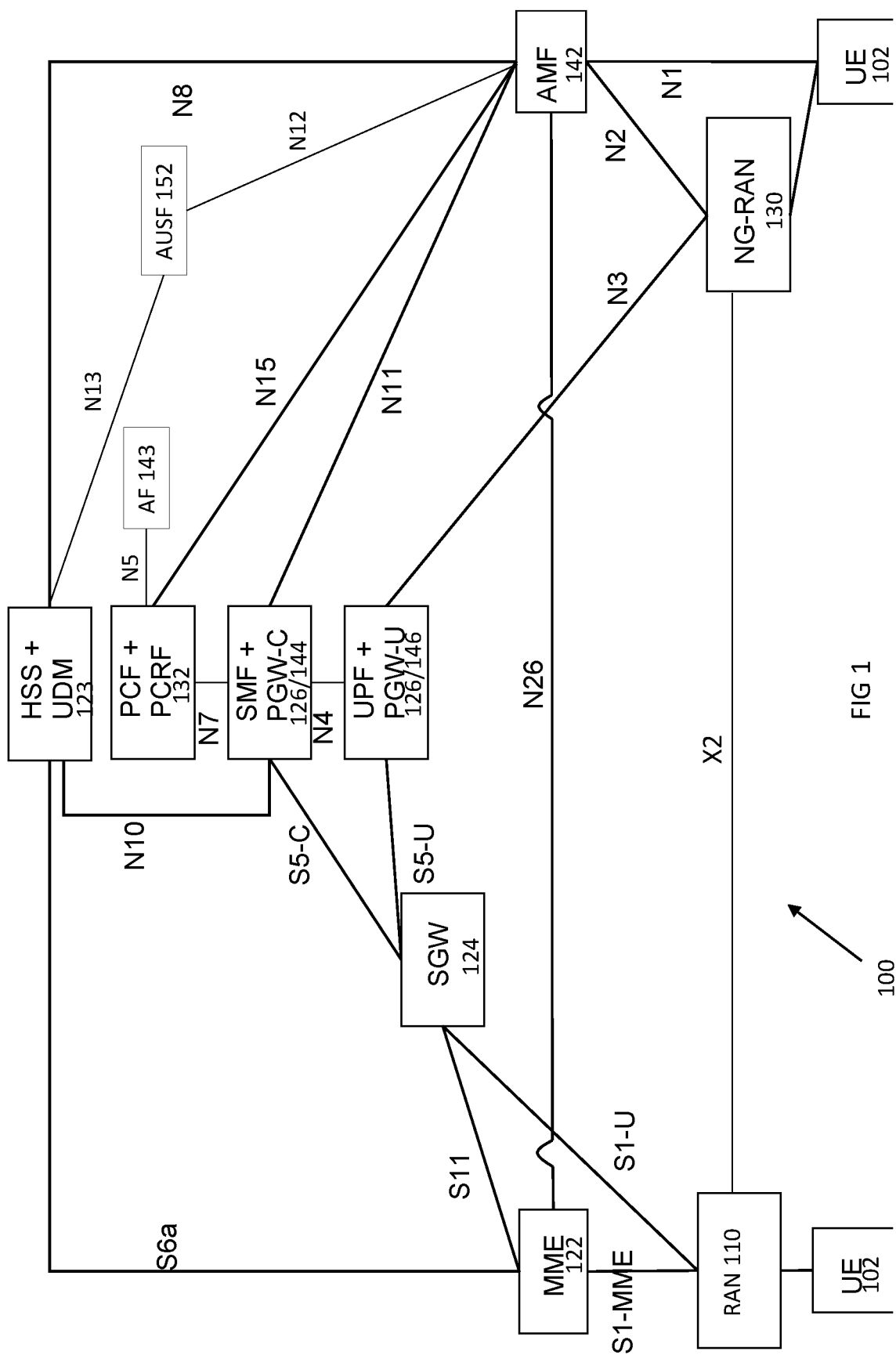
FIG. 1 illustrates combined communication system in accordance with some embodiments.

FIG. 1 illustrates a combined communication system in accordance with some embodiments. The system 100 includes 3GPP LTE/4G and NG network functions. A network function can be implemented as a discrete network element on a dedicated hardware, as a software instance running on dedicated hardware, or as a virtualized function instantiated on an appropriate platform, e.g., dedicated hardware or a cloud infrastructure.

The evolved packet core (EPC) of the LTE/4G network contains protocol and reference points defined for each entity. These core network (CN) entities may include a mobility management entity (MME) 122, serving gateway (S-GW) 124, and paging gateway (P-GW) 126.

In the NG network, the control plane and the user plane may be separated, which may permit independent scaling and distribution of the resources of each plane. The UE 102 may be connected to either an access network or random access network (RAN) 110 and/or may be connected to the NG-RAN 130 (gNB) or an Access and Mobility Function (AMF) 142. The RAN may be an eNB, a gNB or a general non-3GPP access point, such as that for Wi-Fi. The NG core network may contain multiple network functions besides the AMF 112. The network functions may include a User Plane Function (UPF) 146, a Session Management Function (SMF) 144, a Policy Control Function (PCF) 132, an Application Function (AF) 148, an Authentication Server Function (AUSF) 152 and User Data Management (UDM) 128. The various elements are connected by the NG reference points shown in FIG. 1.

The AMF 142 may provide UE-based authentication, authorization, mobility management, etc. The AMF 142 may be independent of the access technologies. The SMF 144 may be responsible for session management and allocation of IP addresses to the UE 102. The SMF 144 may also select and control the UPF 146 for data transfer. The SMF 144 may be associated with a single session of the UE 102 or multiple sessions of the UE 102. This is to say that the UE 102 may have multiple 5G sessions. Different SMFs may be allocated to each session. The use of different SMFs may permit each session to be individually managed. As a consequence, the functionalities of each session may be independent of each other. The UPF 126 may be connected with a data network, with which the UE 102 may communicate, the UE 102 transmitting uplink data to or receiving downlink data from the data network.

The AF 148 may provide information on the packet flow to the PCF 132 responsible for policy control to support a desired QoS. The PCF 132 may set mobility and session management policies for the UE 102. To this end, the PCF 132 may use the packet flow information to determine the appropriate policies for proper operation of the AMF 142 and SMF 144. The AUSF 152 may store data for UE authentication. The UDM 128 may similarly store the UE subscription data.

The gNB 130 may be a standalone gNB or a non-standalone gNB, e.g., operating in Dual Connectivity (DC) mode as a booster controlled by the eNB 110 through an X2 or Xn interface. At least some of functionality of the EPC and the NG CN may be shared (alternatively, separate components may be used for each of the combined component shown). The eNB 110 may be connected with an MME 122 of the EPC through an S1 interface and with a SGW 124 of the EPC 120 through an S1-U interface. The MME 122 may be connected with an HSS 128 through an S6a interface while the UDM is connected to the AMF 142 through the N8 interface. The SGW 124 may connected with the PGW 126 through an S5 interface (control plane PGW-C through S5-C and user plane PGW-U through S5-U). The PGW 126 may serve as an IP anchor for data through the internet.

The NG CN, as above, may contain an AMF 142, SMF 144 and UPF 146, among others. The eNB 110 and gNB 130 may communicate data with the SGW 124 of the EPC 120 and the UPF 146 of the NG CN. The MME 122 and the AMF 142 may be connected via the N26 interface to provide control information there between, if the N26 interface is supported by the EPC 120. In some embodiments, when the gNB 130 is a standalone gNB, the 5G CN and the EPC 120 may be connected via the N26 interface.

Figure 2:
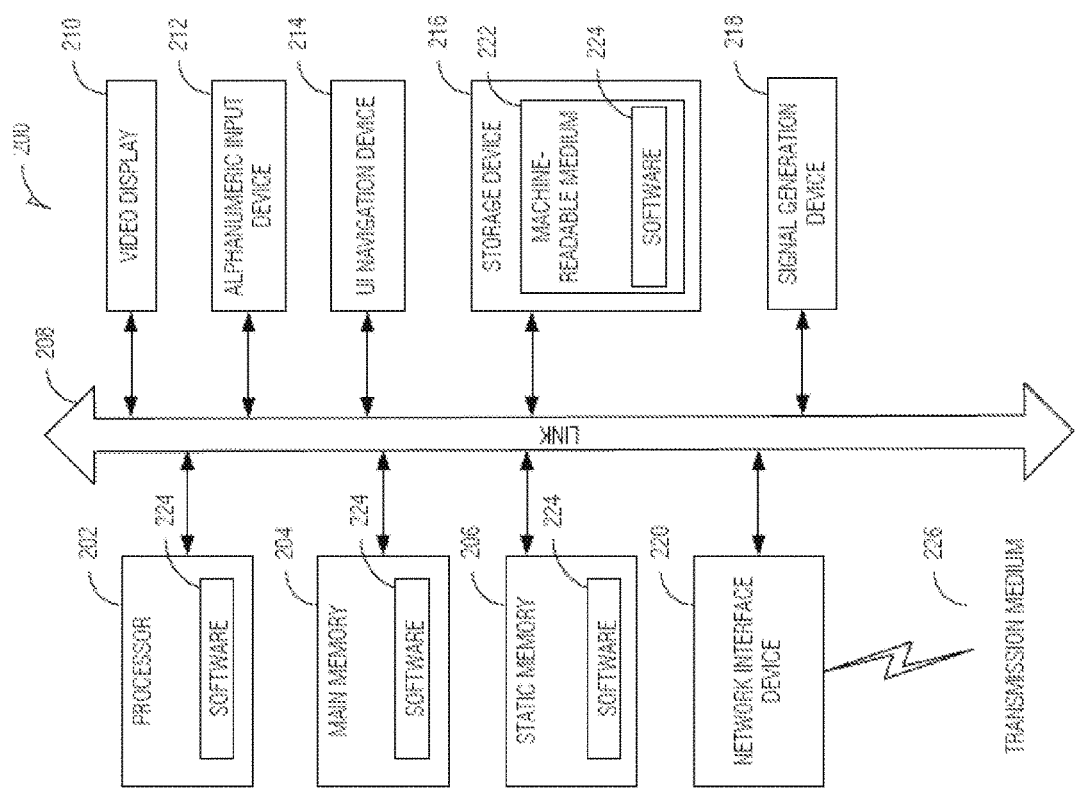
FIG. 2 illustrates a block diagram of a communication device in accordance with some embodiments.

FIG. 2 illustrates a block diagram of a communication device in accordance with some embodiments. In some embodiments, the communication device may be a UE, eNB, gNB or other equipment used in the network environment. For example, the communication device 200 may be a specialized computer, a personal or laptop computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine. In some embodiments, the communication device 200 may be embedded within other, non-communication based devices such as vehicles and appliances.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, successfully or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of transfer protocols (e.g., frame relay, interne protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a NG/NR standards among others. In an example, the network interface device 220 may include one or more physical jacks (e.g., Ethernet, coaxial, or phone jacks) or one or more antennas to connect to the transmission medium 226.

Figure 3:
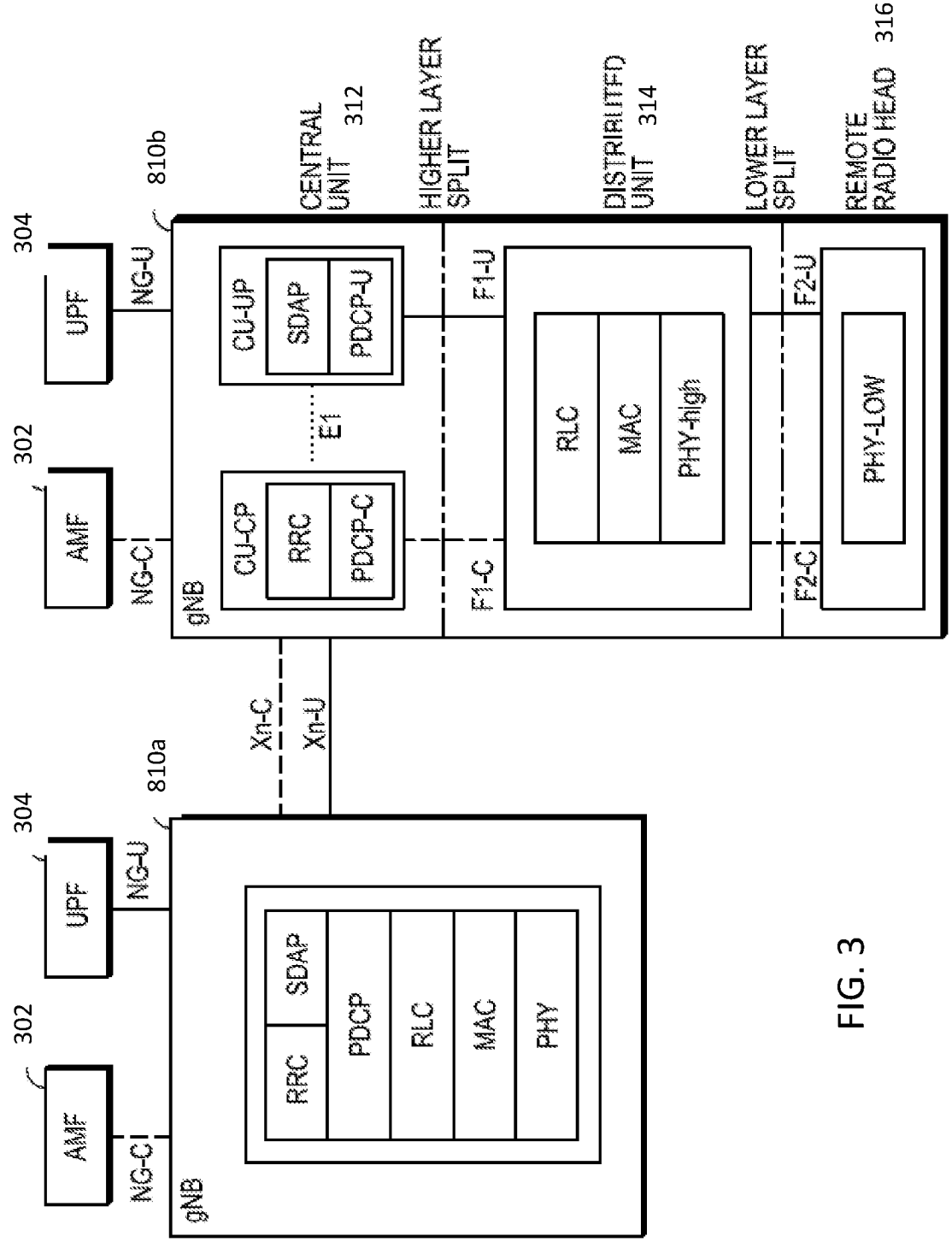
FIG. 3 illustrates interconnections for gNBs in accordance with some embodiments.

One advantage of the NR system is that the UE may be able to take advantage of a dual-connectivity (DC) framework, in which the UE may be connected simultaneously with a master NodeB (MNB) and a secondary NodeB (SNB). The MNB and SNB may be eNBs, gNBs, or a combination thereof, for example. In some embodiments, the MNB may use a single SNB for a bearer associated with the UE. In some embodiments, the MNB may service the UE, so that all UL and DL data flow associated with the bearer is controlled by the MNB. For example, the MNB may transmit packets to the SNB for delivery to the UE. The SNB may provide the MNB with information about packet transmission or delivery to permit the MNB to control packet flow to the SNB to avoid overflow or underflow buffer issues associated with packet delivery to the UE. The packet and control flow may be transmitted over an X2 interface when the MNB and SNB are eNBs over an Xn interface when the MNB and SNB are gNBs (although a combination of eNB and gNB may be used as well). FIG. 3 illustrates interconnections for gNBs in accordance with some embodiments.

As shown in FIG. 3, the gNBs 310a, 310b of the NG-RAN 310 may each be connected with different AMFs 302 and UPFs 304 through an NG-Control plane (NG-C or, as indicated in FIG. 1, N2) interface and an NG-User plane (NG-U or, as indicated in FIG. 1, N3) interface, respectively. In some embodiments, the gNBs 310a, 310b. The gNBs 310a, 310b may be connected with each other via dual Xn interfaces for control plane signaling (Xn-C) and user plane signaling (Xn-U). The control plane functions of the Xn-C interface may include interface management and error handling functionality, connected mode mobility management, support of RAN paging and dual connectivity functions, among others. Examples of the interface management and error handling functionality include setup, reset, removal and configuration update of the Xn interface. Examples of connected mode mobility management include handover procedures, sequence number status transfer and UE context retrieval. Examples of dual connectivity functions include secondary node addition, reconfiguration, modification, and release of the secondary node. The user plane functions of the Xn-U interface may include both data forwarding and flow control between the gNBs 310a, 310b.

Each of the gNBs 310a, 310b may implement protocol entities in the 3GPP protocol stack, in which the layers are considered to be ordered, from lowest to highest, in the order Physical (PHY), Medium Access Control (MAC), Radio Link Control (RLC), Packet Data Convergence Control (PDCP), and Radio Resource Control (RRC)/Service Data Adaptation Protocol (SDAP) (for the control plane/user plane). The protocol layers in each gNB 310a, 310b may be distributed in different units—a Central Unit (CU) 312, at least one Distributed Unit (DU) 314, and a Remote Radio Head (RRH) 316. The CU 312 may provide functionalities such as the control the transfer of user data, and effect mobility control, radio access network sharing, positioning, and session management, except those functions allocated exclusively to the DU 314.

As shown in FIG. 3, the higher protocol layers (PDCP and RRC for the control plane/PDCP and SDAP for the user plane) may be implemented in the CU 312, and the RLC and MAC layers may be implemented in the DU 314. The PHY layer may be split, with the higher PHY layer also implemented in the DU 314, while the lower PHY layer is implemented in the Remote Radio Head 316. The CU 312, DU 314 and RRH 316 may be implemented by different manufacturers, but may nevertheless be connected by the appropriate interfaces therebetween. The CU 312 may be connected with multiple DUs 314.

The interfaces within the gNB include the E1 and fronthaul (F) F1 interface. As shown, a F2 interface may also be present, but the standards for this interface has not been developed yet. The E1 interface may be between a CU control plane (gNB-CU-CP) and the CU user plane (gNB-CU-UP) and thus may support the exchange of signaling information between the control plane and the user plane through E1AP service. The E1 interface may separate Radio Network Layer and Transport Network Layer and enable exchange of UE associated information and non-UE associated information. The E1AP services may be non UE-associated services that are related to the entire E1 interface instance between the gNB-CU-CP and gNB-CU-UP using a non UE-associated signaling connection and UE-associated services that are related to a single UE and are associated with a UE-associated signaling connection that is maintained for the UE. The E1AP services may include an E1 interface management function, an E1 bearer context management function and allocation of tunnel endpoint identifiers (TEIDs).

The F1 interface may be disposed between the CU 312 and the DU 314. The CU 312 may control the operation of the DU 314 over the F1 interface. As the signaling in the gNB is split into control plane and user plane signaling, the F1 interface may be split into the F1-C interface for control plane signaling and the F1-U interface for user plane signaling, which support control plane and user plane separation. The F1 interface, as above may separate the Radio Network and Transport Network Layers and enable exchange of UE associated information and non-UE associated information.

The F2 interface may be between the lower and upper parts of the NR PHY layer. The F2 interface may also be separated into F2-C and F2-U interfaces based on control plane and user plane functionalities.

Before the various interfaces may be used, the gNB may engage in a setup procedure for each interface. After setup, a Bearer Context Setup procedure may permit the gNB-CU-CP to establish a bearer context in the gNB-CU-UP. Subsequently, a Bearer Context Modification procedure may be initiated by either the gNB-CU-CP to modify a bearer context in the gNB-CU-UP. In addition, a Bearer Context Release procedure may be initiated by either the gNB-CU-CP or the gNB-CU-UP respectively to command release of a UE-associated logical E1 connection in the gNB-CU-UP or to request the gNB-CU-CP to release the UE-associated logical E1 connection.

The above procedures, however, lack a procedure to modify the bearer context that is initiated by the gNB-CU-UP. The gNB-CU-UP may determine that such a modification is desired due to, for example, local problems at the gNB-CU-UP or modification of resources (such as migration of a virtual machine) of the gNB-CU-UP. Accordingly, as described herein, a Bearer Context Modification Required procedure may be initiated by the gNB-CU-UP to allow the gNB-CU-UP to modify a bearer context and inform the gNB-CU-CP of the modification. The information elements (IEs) for messages of the Bearer Context Modification Required procedure are also described, to alleviate the local problems and also to support dynamic resource scaling and virtual machine (VM) migration.

In one embodiment, UE-associated signaling which contains information on the uplink (UL) general packet radio service (GPRS) Tunneling Protocol (GTP) may be sent from the gNB-CU-UP to the gNB-CU-CP. The gNB-CU-CP may then establish a new UL GTP Tunnel between the DU and the gNB-CU-UP for a single UE that is affected by the local problems or VM migration of the gNB-CU-UP. In another embodiment, a message that covers a group of affected UEs may be defined to support VM migration of the gNB-CU-UP to reduce the transport overhead compared with the above single UE embodiment. In another embodiment, a Software Defined Network (SDN) switch may be deployed between the DU and the gNB-CU-UP to revise and forward UL/DL packet data units (PDUs) under the control of the gNB-CU-UP.

Figure 4:
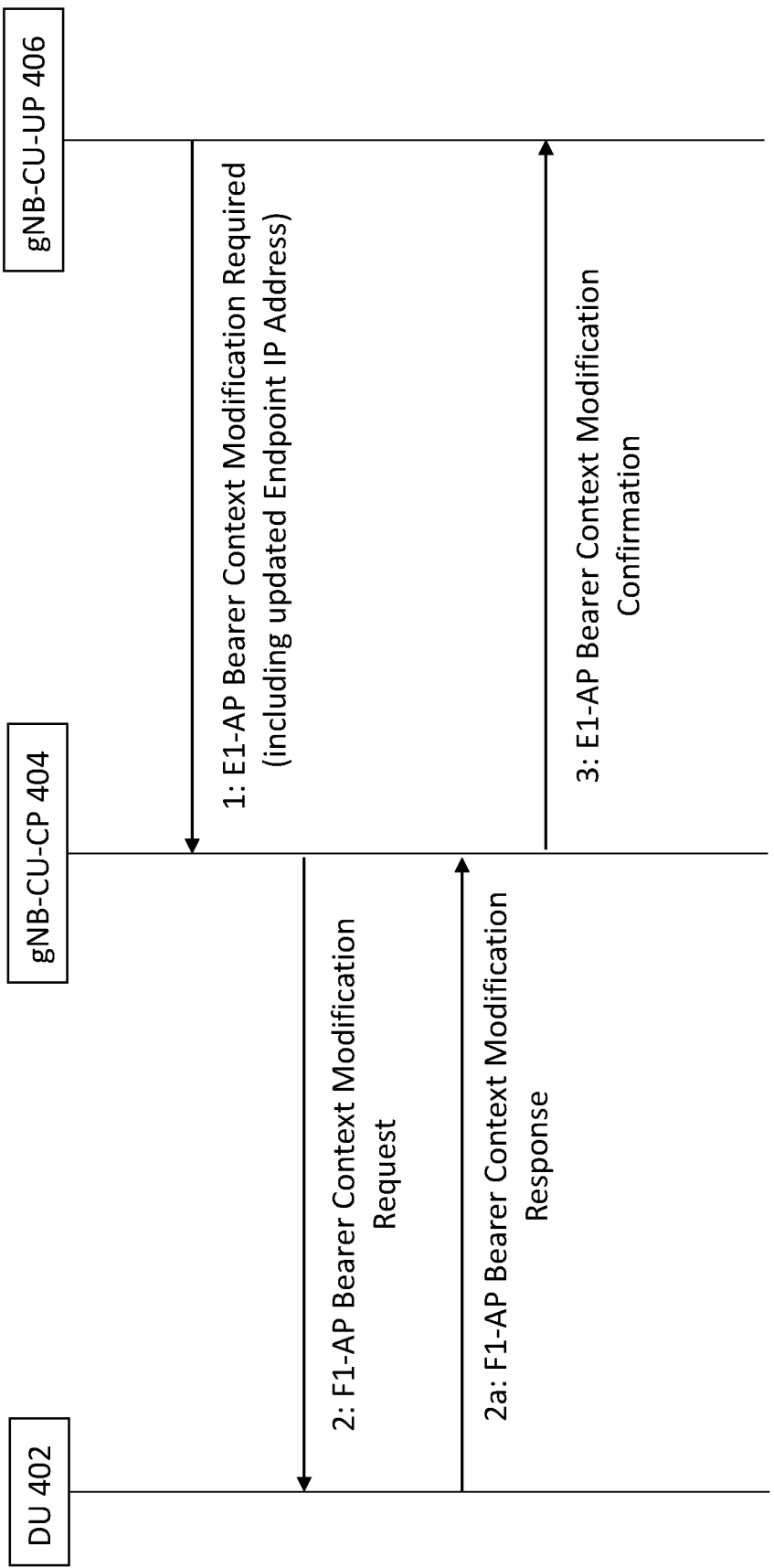
FIG. 4 illustrates an E1 context modification procedure in accordance with some embodiments.

FIG. 4 illustrates an E1 context modification procedure in accordance with some embodiments. If local problems occur, or VM migration is to be effected, the gNB-CU-UP 406 may assign new processors or computing resources for the affected UEs. The gNB-CU-UP 406 at step 1 may initiate an E1 Bearer Context Modification Required procedure to notify the gNB-CU-CP of the updated UL GTP Tunnel Endpoint for a particular UE. Table 1 shows an example of a Bearer Context Modification Required message. As in other tables, some IEs may not be provided for convenience.

TABLE 1

| IE/Group Name | Presence | Range | IE type and reference |
|---|---|---|---|
| Message Type | M | | |
| gNB-CU-CP UE E1AP ID | M | | UE ID |
| gNB-CU-UP UE E1AP ID | M | | UE ID |
| DRB to Be Modified List | | 0 ... 1 | |
| >DRB to Be Modified Item IEs | | 1 ... <maxnoofDRBs> | |
| >>DRB ID | M | | |
| >> UL Tunnels to be modified List | | 0 ... 1 | |
| >>> UL Tunnels to Be modified Item IEs | | 1 ... <maxnoofULTunnels> | |
| >>>>UL GTP Tunnel Endpoint | M | | GTP Tunnel TEID and TNL address |

The gNB-CU-CP UE E1AP ID uniquely identifies the UE association over the E1 interface within the gNB-CU-CP and the gNB-CU-UP UE E1AP ID uniquely identifies the UE association over the E1 interface within the gNB-CU-UP. The DRB ID IE uniquely identifies a DRB (whose context is to be modified) for the UE. The UL GTP Tunnel Endpoint may be contained in a UP Transport Layer Information IE that identifies a transport bearer associated with a data radio bearer (DRB). The UP Transport Layer Information IE may contain the Transport Layer Address (the IP address to be used for the user plane transport—i.e., the TNL address, which is interpreted by the transport layer rather than the radio network layer) and the GTP Tunnel Endpoint Identifier (TEID) to be used for the user plane transport. In some embodiments, the UP Transport Layer Information IE may be contained in an IE that contains information related to a cell group (e.g., master cell group or secondary cell group) that the gNB-CU-UP is allowed to change. In either case, however, the GTP Tunnel TED and TNL address may be provided in the Bearer Context Modification Required message.

At step 2, the gNB-CU-CP 404 may send an F1-AP UE Context Modification Request message to notify the DU 402 of the new UL GTP Tunnel Endpoint. At step 2a, the DU 402 may, in response to reception of the F1-AP UE Context Modification Request message, send an F1-AP UE Context Modification Response message to the gNB-CU-CP 404.

At step 3, the gNB-CU-CP 404 may confirm the success of the bearer context modification. If a DL GTP Tunnel Endpoint IE is included for DRB, the gNB-CU-UP 406 may use the new DL GTP Tunnel Endpoint to deliver DL PDUs; otherwise the gNB-CU-UP 406 may continue to use the old DL GTP Tunnel Endpoint. Before transmission of each message, e.g., the Bearer Context Modification Required message and the Bearer Context Modification Confirm message, the gNB-CU-CP 404 or the gNB-CU-UP 406 that is to transmit the message may store the information of the IEs and then encode the message for transmission. Similarly, after reception of each message, e.g., the Bearer Context Modification Required message and the Bearer Context Modification Confirm message, the gNB-CU-CP 404 or the gNB-CU-UP 406 that received the message may store the information of the IEs after decoding the message.

After confirmation, the gNB-CU-UP 406 may continue to use the DRB for transmission of DL PDUs to the UE (using the new GTP Tunnel TEID and TNL address). The gNB-CU-CP 406 may also try to change the cell group related configuration. If unable to update the requested cell group related configuration, the gNB-CU-CP 406 may include the current cell group configuration in the DRB Modified List IE in the Bearer Context Modification Confirm message.

Table 2 shows an example of a Bearer Context Modification Confirm message.

TABLE 2

| IE/Group Name | Presence | Range | IE type and reference |
|---|---|---|---|
| Message Type | M | | |
| gNB-CU-CP UE E1AP ID | M | | UE ID |
| gNB-CU-UP UE E1AP ID | M | | UE ID |
| DRB to Be Modified List | | 0 ... 1 | |
| >DRB to Be Modified Item IEs | | 1 ... <maxnoofDRBs> | |
| >>DRB ID | M | | |
| >> DL Tunnels to be modified List | | 0 ... 1 | |
| >>> DL Tunnels to Be modified Item IEs | | 1 ... <maxnoofDLTunnels> | |
| >>>>DL GTP Tunnel Endpoint | M | | GTP Tunnel TEID and TNL address |

In another embodiment, the gNB-CU-UP may include the UL Tunnel Endpoint information for all affected UEs in the Bearer Context Modification Required message. An example of such a Bearer Context Modification Required message is shown in Table 3.

TABLE 3

| IE/Group Name | Presence | Range | IE type and reference |
|---|---|---|---|
| Message Type | M | | |
| UE to Be Modified List | | | |
| > UE to Be Modified Item IEs | | | |
| >>gNB-CU-CP UE E1AP ID | M | | UE ID |
| >>gNB-CU-UP UE E1AP ID | M | | UE ID |
| >>DRB to Be Modified List | | 0 ... 1 | |
| >>>DRB to Be Modified Item IEs | | 1 ... <maxnoofDRBs> | |
| >>>>DRB ID | M | | |
| >>>> UL Tunnels to be modified List | | 0 ... 1 | |
| >>>>> UL Tunnels to Be modified Item IEs | | 1 ... <maxnoofULTunnels> | |
| >>>>>>UL GTP Tunnel Endpoint | M | | GTP Tunnel TEID and TNL address |

Accordingly, the Bearer Context Modification Confirm message may include the DL Tunnel Endpoint information for all affected UEs, an example of which is as shown in Table 4. If the DL GTP Tunnel Endpoint IE for a particular UE is included, the gNB-CU-UP may use the new DL GTP Tunnel Endpoint to deliver DL PDUs to the particular UE. If the DL GTP Tunnel Endpoint IE for a particular UE is not included, the gNB-CU-UP may use the old DL GTP Tunnel Endpoint to deliver DL PDUs to the particular UE.

TABLE 4

| IE/Group Name | Presence | Range | IE type and reference |
|---|---|---|---|
| Message Type | M | | |
| UE to Be Modified List | | | |
| > UE to Be Modified Item IEs | | | |
| >>gNB-CU-CP UE E1AP ID | M | | UE ID |
| >>gNB-CU-UP UE E1AP ID | M | | UE ID |
| >>DRB to Be Modified List | | 0 ... 1 | |
| >>>DRB to Be Modified Item IEs | | 1 ... <maxnoofDRBs> | |
| >>>>DRB ID | M | | |
| >>>> DL Tunnels to be modified List | | 0 ... 1 | |
| >>>>> DL Tunnels to Be modified Item IEs | | 1 ... <maxnoofULTunnels> | |
| >>>>>>DL GTP Tunnel Endpoint | M | | GTP Tunnel TEID and TNL address |

In another embodiment, a SDN switch may deployed between the DU and the gNB-CU-UP. For dynamic resource scaling or VM migration, the gNB-CU-UP may assign new processors, or computing resources for the affected UEs. The gNB-CU-UP may subsequently configure the SDN switch to revise the destination TNL (e.g., IP) address of UL PDUs to the new address for the GTP-U packets of all affected UEs. Re-calculation of the checksum may also be performed. For the DL PDUs, the source Transport Network Layer (TNL) address can be revised to the old address for the GTP-U packets of all affected UEs if configured by the gNB-CU-UP.

Although an aspect has been described with reference to specific example aspects, it will be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus, the

What is claimed is:

1. A computer-readable storage medium that stores instructions for execution by one or more processors of a central unit user plane (gNB-CU-UP) of a next generation NodeB (gNB), the one or more processors to configure the gNB-CU-UP to, when the instructions are executed:
   determine whether to modify a bearer context associated with a data radio bearer (DRB) for a user equipment (UE) served by the gNB-CU-UP; and
   in response to a determination that the context is to be modified, send, to a central unit control plane (gNB-CU-CP) connected to the gNB-CU-UP through an E1 interface, a Bearer Context Modification Required message, the Bearer Context Modification Required message comprising a general packet radio service (GPRS) Tunneling Protocol (GTP) Tunnel Endpoint Identifier (TEID) and transport network layer (TNL) address to be used after modification of the bearer context.

2. The medium of claim 1, wherein the Bearer Context Modification Required message further comprises:
   a gNB-CU-CP UE E1AP identifier (ID) that uniquely identifies a first UE association of the UE over the E1 interface within the gNB-CU-CP,
   a gNB-CU-UP UE E1AP ID that uniquely identifies a second UE association of the UE over the E1 interface within the gNB-CU-UP, and
   a DRB ID IE that uniquely identifies the DRB.

3. The medium of claim 1, wherein the Bearer Context Modification Required message further comprises:
   a plurality of gNB-CU-CP UE E1AP identifiers (IDs), each of which uniquely identifies a unique first UE association for each UE of a plurality of UEs over the E1 interface within the gNB-CU-CP,
   a plurality of gNB-CU-UP UE E1AP IDs, each of which uniquely identifies a unique second UE association for each UE of the plurality of UEs over the E1 interface within the gNB-CU-UP, and
   a DRB ID IE that uniquely identifies the DRB.

4. The medium of claim 1, wherein:
   determination of whether to modify the bearer context is due to local problems at the gNB-CU-UP.

5. The medium of claim 1, wherein the one or more processors further configure the gNB to, when the instructions are executed:
   receive a Bearer Context Modification Confirm message from the gNB-CU-CP to confirm the modification of the bearer context in response to transmission of the Bearer Context Modification Required message.

6. The medium of claim 5, wherein the Bearer Context Modification Confirm message comprises:
   a gNB-CU-CP UE E1AP identifier (ID) that uniquely identifies a first UE association of the UE over the E1 interface within the gNB-CU-CP,
   a gNB-CU-UP UE E1AP ID that uniquely identifies a second UE association of the UE over the E1 interface within the gNB-CU-UP, and
   a DRB ID IE that uniquely identifies the DRB.

7. The medium of claim 5, wherein the one or more processors further configure the gNB to, when the instructions are executed:
   use the GTP TEID and TNL address for downlink packet data unit (PDU) transmission after reception of the Bearer Context Modification Confirm message.

8. The medium of claim 1, wherein:
   the GTP TEID and TNL address are contained in a UP Transport Layer Information IE, and
   the UP Transport Layer Information IE is contained in an IE that comprises information related to a cell group that the gNB-CU-UP is allowed to change.

9. An apparatus of a next generation NodeB (gNB), the apparatus comprising:
   processing circuitry; and memory,
   wherein the gNB is configured with logical nodes including a gNB central unit (gNB-CU) and a gNB distributed unit (gNB-DU), the gNB-CU comprising a gNB-CU control plane (gNB-CU-CP) for control-plane functionality and a gNB-CU user plane (gNB-CU-UP) for user-plane functionality, the gNB-CU-CP configured to communicate with the gNB-CU-UP over an E1 interface, the gNB-CU-UP configured to communicate user plane messages with the gNB-DU over an F1 user-plane interface (F1-U), the gNB-CU-CP is configured to communicate control plane messages with the gNB-DU over an F1 control plane interface (F1-C),
   the processing circuitry configured to:
      determine whether to modify a bearer context associated with a data radio bearer (DRB) for a particular user equipment (UE) served by the gNB-CU-UP;
      in response to a determination that the context is to be modified, generate, for transmission to the gNB-CU-CP, a Bearer Context Modification Required message, the Bearer Context Modification Required message comprising a general packet radio service (GPRS) Tunneling Protocol (GTP) Tunnel Endpoint Identifier (TEID) and transport network layer (TNL) address to be used after modification of the bearer context; and
      decode a Bearer Context Modification Confirm message from the gNB-CU-CP that confirms the modification of the bearer context in response to transmission of the Bearer Context Modification Required message; and
   the memory configured to store the GTP TEID and TNL address.

10. The apparatus of claim 9, wherein the Bearer Context Modification Required message further comprises:
   a gNB-CU-CP UE E1AP identifier (ID) that uniquely identifies a first UE association of the UE over the E1 interface within the gNB-CU-CP,
   a gNB-CU-UP UE E1AP ID that uniquely identifies a second UE association of the UE over the E1 interface within the gNB-CU-UP, and
   a DRB ID IE that uniquely identifies the DRB.

11. The apparatus of claim 9, wherein the Bearer Context Modification Required message further comprises:
   a plurality of gNB-CU-CP UE E1AP identifiers (IDs), each of which uniquely identifies a unique first UE association for each UE of a plurality of UEs over the E1 interface within the gNB-CU-CP,
   a plurality of gNB-CU-UP UE E1AP IDs, each of which uniquely identifies a unique second UE association for each UE of the plurality of UEs over the E1 interface within the gNB-CU-UP, and
   a DRB ID IE that uniquely identifies the DRB.

12. The apparatus of claim 9, wherein the processing circuitry is further configured to:
   determine that local problems exist at the gNB-CU-UP and to modify the bearer context due to the local problems.

13. The apparatus of claim 9, wherein the Bearer Context Modification Confirm message comprises:
   a gNB-CU-CP UE E1AP identifier (ID) that uniquely identifies a first UE association of the UE over the E1 interface within the gNB-CU-CP,
   a gNB-CU-UP UE E1AP ID that uniquely identifies a second UE association of the UE over the E1 interface within the gNB-CU-UP, and
   a DRB ID IE that uniquely identifies the DRB.

14. The apparatus of claim 9, wherein the processing circuitry is further configured to:
   use the GTP TEID and TNL address for downlink packet data unit (PDU) transmission after reception of the Bearer Context Modification Confirm message.

15. An apparatus of a next generation NodeB (gNB), the apparatus comprising:
   processing circuitry; and memory,
   wherein the gNB is configured with logical nodes including a gNB central unit (gNB-CU) and a gNB distributed unit (gNB-DU), the gNB-CU comprising a gNB-CU control plane (gNB-CU-CP) for control-plane functionality and a gNB-CU user plane (gNB-CU-UP) for user-plane functionality, the gNB-CU-CP configured to communicate with the gNB-CU-UP over an E1 interface, the gNB-CU-UP configured to communicate user plane messages with the gNB-DU over an F1 user-plane interface (F1-U), the gNB-CU-CP is configured to communicate control plane messages with the gNB-DU over an F1 control plane interface (F1-C), the processing circuitry configured to:
      decode, from the gNB-CU-UP, a Bearer Context Modification Required message, the Bearer Context Modification Required message comprising a general packet radio service (GPRS) Tunneling Protocol (GTP) Tunnel Endpoint Identifier (TEID) and transport network layer (TNL) address to be used after modification of a bearer context associated with a data radio bearer (DRB) for a particular user equipment (UE) served by the gNB-CU-UP; and
      generate, for transmission to the gNB-CU-UP, a Bearer Context Modification Confirm message from the gNB-CU-CP that confirms the modification of the bearer context in response to transmission of the Bearer Context Modification Required message; and
   the memory configured to store the GTP TEID and TNL address.

16. The apparatus of claim 15, wherein the Bearer Context Modification Required message further comprises:
   a gNB-CU-CP UE E1AP identifier (ID) that uniquely identifies a first UE association of the UE over the E1 interface within the gNB-CU-CP,
   a gNB-CU-UP UE E1AP ID that uniquely identifies a second UE association of the UE over the E1 interface within the gNB-CU-UP, and
   a DRB ID IE that uniquely identifies the DRB.

17. The apparatus of claim 15, wherein the Bearer Context Modification Required message further comprises:
   a plurality of gNB-CU-CP UE E1AP identifiers (IDs), each of which uniquely identifies a unique first UE association for each UE of a plurality of UEs over the E1 interface within the gNB-CU-CP,
   a plurality of gNB-CU-UP UE E1AP IDs, each of which uniquely identifies a unique second UE association for each UE of the plurality of UEs over the E1 interface within the gNB-CU-UP, and
   a DRB ID IE that uniquely identifies the DRB.

18. The apparatus of claim 15, wherein the Bearer Context Modification Confirm message comprises:
   a gNB-CU-CP UE E1AP identifier (ID) that uniquely identifies a first UE association of the UE over the E1 interface within the gNB-CU-CP,
   a gNB-CU-UP UE E1AP ID that uniquely identifies a second UE association of the UE over the E1 interface within the gNB-CU-UP, and
   a DRB ID IE that uniquely identifies the DRB.

19. The apparatus of claim 15, wherein the processing circuitry is further configured to:
   generate, for transmission to a distributed unit (DU) of the gNB, an F1-AP UE Context Modification Request message over an F1 interface between the gNB-CU-CP and the DU to notify the DU of the GTP TED and TNL address.

20. The apparatus of claim 19, wherein the processing circuitry is further configured to:
   decode, from the DU, an F1-AP UE Context Modification Response message in response to the F1-AP UE Context Modification Request message.

* * * * *